US012570555B2

(12) United States Patent
Miyazawa et al.

(10) Patent No.: US 12,570,555 B2
(45) Date of Patent: Mar. 10, 2026

(54) METHOD AND APPARATUS FOR PRODUCING WATER FOR PURE WATER, METHOD FOR PRODUCING PURE WATER, AND PURE WATER PRODUCTION SYSTEM

(71) Applicant: Nomura Micro Science Co., Ltd., Atsugi (JP)

(72) Inventors: Hiroki Miyazawa, Atsugi (JP); Yoshihiro Akimoto, Atsugi (JP); Yuya Hirahara, Atsugi (JP); Masamitsu Iiyama, Atsugi (JP)

(73) Assignee: NOMURA MICRO SCIENCE CO., LTD., Atsugi (JP)

( * ) Notice: Subject to any disclaimer, the term of this patent is extended or adjusted under 35 U.S.C. 154(b) by 0 days.

(21) Appl. No.: 18/792,821

(22) Filed: Aug. 2, 2024

(65) Prior Publication Data

US 2025/0051198 A1 Feb. 13, 2025

(30) Foreign Application Priority Data

Aug. 10, 2023 (JP) .................................. 2023-131126

(51) Int. Cl.
*C02F 1/68* (2023.01)
*C02F 1/32* (2023.01)
(Continued)

(52) U.S. Cl.
CPC .................. *C02F 1/68* (2013.01); *C02F 1/32* (2013.01); *C02F 1/42* (2013.01); *C02F 1/444* (2013.01);
(Continued)

(58) Field of Classification Search
CPC ...... C02F 1/68; C02F 1/32; C02F 1/42; C02F 1/444; C02F 1/66; C02F 1/70;
(Continued)

(56) References Cited

U.S. PATENT DOCUMENTS 6,464,867 B1 * 10/2002 Morita .................... C01B 13/10
210/765
2010/0206809 A1 8/2010 Ikuno
(Continued)

FOREIGN PATENT DOCUMENTS

CN 101808946 A 8/2010
CN 102363536 A * 2/2012
(Continued)

OTHER PUBLICATIONS

WO_2017175657_A1, Saito et. al (Year: 2017).*
(Continued)

*Primary Examiner* — Patrick Orme
(74) *Attorney, Agent, or Firm* — Maier & Maier, PLLC

(57) ABSTRACT

A method and apparatus for producing water for pure water, the method and apparatus capable of efficiently adding agents to water to be supplied to a reverse osmosis membrane. The method for producing water for pure water includes: obtaining first treated water by adding a polyaluminum chloride to raw water containing free chlorine; obtaining second treated water by adding a reducing agent containing sodium disulfite as an active ingredient to the first treated water; and treating the second treated water with a reverse osmosis membrane.

18 Claims, 7 Drawing Sheets

(51) Int. Cl.

| | | |
|---|---|---|
| *C02F 1/42* | (2023.01) |
| *C02F 1/44* | (2023.01) |
| *C02F 1/66* | (2023.01) |
| *C02F 1/70* | (2023.01) |
| *C02F 103/04* | (2006.01) |

(52) U.S. Cl.
CPC .................. *C02F 1/66* (2013.01); *C02F 1/70* (2013.01); *C02F 2103/04* (2013.01)

(58) Field of Classification Search
CPC ...... C02F 2103/04; C02F 1/001; C02F 1/441; C02F 1/5245; C02F 1/76; C02F 9/00; C02F 2103/02; C02F 1/705; C02F 2209/11; B01D 61/04; B01D 61/10; B01D 61/14; B01D 61/58; B01D 2311/2642
See application file for complete search history.

(56) References Cited

U.S. PATENT DOCUMENTS

| | | |
|---|---|---|
| 2012/0024794 A1 | 2/2012 | Fischmann |
| 2013/0306532 A1 | 11/2013 | Fischmann |
| 2017/0266618 A1* | 9/2017 | Taniguchi .............. B01D 61/58 |

FOREIGN PATENT DOCUMENTS

| | | |
|---|---|---|
| CN | 103608296 A | 2/2014 |
| CN | 104857747 A | 8/2015 |
| CN | 109179816 A | 1/2019 |
| EP | 3441368 A1 | 2/2019 |
| JP | H08-117747 A | 5/1996 |
| JP | H09-094585 A | 4/1997 |
| JP | H11-239789 A | 9/1999 |
| JP | 2005-224761 A | 8/2005 |
| JP | 2009-262122 A | 11/2009 |
| JP | 2010-202524 A | 9/2010 |
| JP | 2012-086149 A | 5/2012 |
| JP | 2021-137710 A | 9/2021 |
| JP | 2022-165279 A | 10/2022 |
| WO | 2011125764 A1 | 10/2011 |
| WO | 2017/175657 A1 | 10/2017 |

OTHER PUBLICATIONS

JP_2012086149_A, Kato et al (Year: 2012).*
CN_115947501_A, Gong et. al (Year: 2023).*
TW_1648093_B, Ikuno (Year: 2019).*
What Type of Water Treatment System Do I Need?, Clean Water Store (Year: 2015).*
CN102363536A, Li et. al (Year: 2012).*
WaterWorld (Year: 1999).*
Carbotecnia (Year: 2020).*
Mmwr, "Elevated Serum Aluminum Levels in Hemodialysis Patients Associated with Use of Electric Pumps—Wyoming, 2007," MMWR Weekly, Jun. 6, 27, 2008/57 (25); pp. 689-691. (Year: 2008).*
Pait, "Measurement of Turbidity, Suspended Sediments and Nutrients in Three Rivers that Drain to the Achang Preserve from the Manell Watershed, Guam" NOAA Technical Memorandum NOS NCCOS 268 Dec. 2019. 42 pages (Year: 2019).*
"What is Chlorination? (Wayback machine date: Feb. 13, 2020)." 13 pages (Year: 2020).*
Lapointe et al ("Identifying the best coagulant for simultaneous water treatment objectives: Interactions of mononuclear and polynuclear aluminum species with different natural organic matter fractions," Journal of Water Process Engineering 40 (2021) 101829, 12 pages. (Year: 2021).*
Office Action issued on Oct. 8, 2024, in corresponding Japanese Application No. 2023-131126, 6 pages.
Decision to Grant a Patent issued on Jan. 14, 2025, in corresponding Japanese Application No. 2023-131126, 8 pages.
Office Action issued on Apr. 4, 2025, in corresponding Chinese Application No. 202411057915.6, 18 pages.
Office Action issued on Jun. 2, 2025, in corresponding Korean Application No. 10-2024-0101506, 17 pages.
Office Action issued on Jul. 2, 2025, in corresponding Chinese Application No. 202411057915.6, 12 pages.
Office Action issued on Sep. 12, 2025, in corresponding Chinese Application No. 202411057915.6, 14 pages.
Office Action issued on Dec. 22, 2025, in corresponding Korean Application No. 10-2024-0101506, 10 pages.

\* cited by examiner

METHOD AND APPARATUS FOR PRODUCING WATER FOR PURE WATER, METHOD FOR PRODUCING PURE WATER, AND PURE WATER PRODUCTION SYSTEM

TECHNICAL FIELD

The present invention relates to a method and apparatus for producing water for pure water, a method for producing pure water, and a pure water production system.

BACKGROUND

In water treatment, such as production of industrial water from river water, well water, lake water, and the like, and wastewater treatment, coagulation treatment is performed to remove suspended matter, dissolved organic matter, and/or suspended matter of colloidal silica and/or the like. In the coagulation treatment, polyaluminum chloride (PAC) is used as a coagulant. PAC is widely used because of its low cost and wide pH range for coagulation.

For the use of PAC in production of industrial water and wastewater treatment, a method is known in which PAC with relatively low basicity (75% or less) is mixed with wastewater to form coarse aggregates of suspended matter, and the coarse aggregates are removed by dead-end filtration (see, e.g., Patent Literature 1). However, a slow filtration apparatus is essential for this method, thus requiring a large ground area for installing the slow filtration apparatus. For example, if 100 m³/h of raw water is treated by this method, it would require installation of a circular slow filtration apparatus with a radius of 12 m. In addition, a facility for further treating the treated water is not assumed in the method. Thus the method may not be readily applicable, and its use may be limited to facilities such as a water purification plant. Thus, the method may not be easily employed in the production of pure water or ultrapure water.

Thus, a microfloc method using PAC is also used. This is a method in which PAC is directly injected into tap water, industrial water, or the like, or the mixture is rapidly stirred after injection to form microfloc, and the microfloc is removed by filtration without sedimentation treatment (see, e.g., Patent Literature 2).

In the production of pure water or ultrapure water used in the production process of semiconductors, liquid crystals, or the like, tap water, industrial water, or the like is used as raw water, and pretreated raw water is passed through a membrane treatment apparatus, such as a reverse osmosis membrane apparatus (RO) and an ultrafiltration apparatus (UF), and then treated with a combination of an ion exchange resin apparatus, an ultraviolet irradiation apparatus, and/or the like.

Here, in the pretreatment, to prevent troubles, such as proliferation of viable bacteria present in the raw water and resulting generation of slime, the treatment is usually performed after a chlorine-based disinfectant, such as hypochlorous acid, is added to the raw water. However, treating raw water containing free chlorine (also referred to as residual chlorine) derived from the disinfectant or the like with a reverse osmosis membrane would lead to rapid deterioration of the reverse osmosis membrane. Thus, the free chlorine is decomposed with a reducing agent before the raw water is supplied to the reverse osmosis membrane apparatus. In addition, to prevent troubles caused by viable bacteria in subsequent stages, an oxidizing disinfectant other than a free chlorine-based disinfectant is added after the addition of the reducing agent. However, in this method, the reducing agent is added in excess to completely decompose free chlorine. Thus, this leads to an excess of the reducing agent, whereby the oxidizing disinfectant is decomposed and disappears. The decomposition and disappearance of the oxidizing disinfectant may cause the formation of a biofilm by viable bacteria, and thus the oxidizing disinfectant is added in excess corresponding to the excess of the reducing agent. However, these methods have a problem in that the control of the amounts of the reducing agent and the oxidizing agent added is complicated and a problem of increased amounts of the reducing agent and the oxidizing agent added. For this problem, an apparatus is known in which a means for measuring the residual chlorine concentration in raw water is provided, and the injection of a reducing agent is controlled by an injection means to allow a given concentration of chlorine to remain (see, e.g., Patent Literature 3).

In addition, there is also an attempt to use a mixture of a chlorine-based disinfectant and a sulfamic acid compound in place of a chlorine-based disinfectant for disinfection of viable bacteria in raw water. However, disinfection of raw water rich in viable bacteria requires increased amounts of a chlorine-based disinfectant and a sulfamic acid compound added, and this results in a problem in that a small amount of free chlorine contained in the mixture of a chlorine-based disinfectant and a sulfamic acid compound remains in the raw water (see, e.g., Patent Literature 4).

PATENT LITERATURE

Patent Literature 1: JP 2012-086149 A
Patent Literature 2: JP 2022-165279 A
Patent Literature 3: JP 2021-137710 A
Patent Literature 4: JP 2010-202524 A

SUMMARY

As described above, in the production of pure water or ultrapure water, treating raw water containing residual chlorine with a reverse osmosis membrane presents the following problems: difficulty in the control of the amounts of the oxidizing agent and the reducing agent added; and an increase in amounts of the agents used. The increase in the amounts of the agents used leads to an increase in cost and a problem of environmental load.

In addition, it is difficult to quantify the amount of the reducing agent added in excess, and thus setting optimum amounts of the agents for use has also been difficult.

The present invention has been made to solve the problems described above, and an object of the present invention is to provide a method and apparatus for producing water for pure water, with which agents can be efficiently added to water supplied for a reverse osmosis membrane.

In addition, another object of the present invention is to provide a method and system for producing pure water, with which agents can be efficiently added to water supplied for a reverse osmosis membrane.

A production method, a production apparatus, and a pure water production system according to embodiments of the present invention are as follows.

[1] A method for producing water for pure water, the method including:

adding polyaluminum chloride to raw water containing free chlorine to obtain first treated water;

adding a reducing agent containing sodium disulfite as an active ingredient to the first treated water to obtain second treated water; and treating the second treated water with a reverse osmosis membrane.

[2] The production method according to [1], in which the first treated water containing microfloc is obtained by adding polyaluminum chloride with high basicity to the raw water.

[3] The production method according to [1] or [2], in which the raw water has a turbidity of 1 NTU or more and 100 NTU or less.

[4] The production method according to any one of [1] to [3], in which the polyaluminum chloride has a basicity of more than 75%.

[5] The production method according to any one of [1] to [4], in which the polyaluminum chloride includes aluminum chloride pentahydroxide, and an amount of the aluminum chloride pentahydroxide added is in an amount of 0.25 mg/L or more and 5 mg/L or less in terms of concentration of aluminum oxide ($Al_2O_3$) relative to the raw water.

[6] The production method according to [1] to [5], the method including:

filtering the first treated water by one or more selected from sand filtration, multimedia filter (MMF) filtration, a microfiltration (MF) apparatus, and ultrafiltration, in which the reducing agent is added to the treated water obtained in the filtering the first treated water.

[7] The production method according to [1] to [6], in which a free chlorine concentration in the raw water is 0.1 mg/L or more and 2 mg/L or less as $Cl_2$, and an amount of the reducing agent added is 0.1 mg/L or more and 5 mg/L or less in terms of the amount of sodium disulfite.

[8] The production method according to [1] to [7], in which permeate water of the reverse osmosis membrane has a turbidity of 0.01 or more and 0.4 or less and an aluminum concentration of 0.01 mg/L or more and 0.04 mg/L or less.

[9] A method for producing pure water, the method including:

producing water for pure water, including:

adding polyaluminum chloride to raw water containing free chlorine to obtain first treated water;

adding a reducing agent containing sodium disulfite as an active ingredient to the first treated water to obtain second treated water; and treating the second treated water with a reverse osmosis membrane;

ultraviolet oxidation; and ion exchanging in this order.

[10] An apparatus for producing water for pure water, the apparatus including:

a raw water feeder configured to supply raw water containing free chlorine;

a polyaluminum chloride feeder configured to add polyaluminum chloride to the raw water;

a reducing agent feeder configured to add a reducing agent containing sodium disulfite as an active ingredient to first treated water obtained by adding polyaluminum chloride to the raw water; and a reverse osmosis membrane apparatus configured to treat second treated water with a reverse osmosis membrane, the second treated water being produced by adding the reducing agent.

[11] The production apparatus according to [10], in which the raw water has a turbidity of 1 NTU or more and 100 NTU or less.

[12] The production apparatus according to [10] or [11], in which the polyaluminum chloride has a basicity of more than 75%.

[13] The production apparatus according to any one of [10] to [12], in which the polyaluminum chloride includes aluminum chloride pentahydroxide, and the polyaluminum chloride feeder is configured to supply aluminum chloride pentahydroxide in an amount of 0.25 mg/L or more and 5 mg/L or less in terms of concentration of aluminum oxide ($Al_2O_3$) relative to the raw water.

[14] The production apparatus according to any one of [10] to [13], the apparatus including one or more types selected from a sand filtration apparatus, a multimedia filter (MMF) filtration apparatus, a microfiltration (MF) apparatus, and an ultrafiltration apparatus between the polyaluminum chloride feeder and the reducing agent feeder.

[15] A pure water production system including:

the apparatus for producing water for pure water described in any one of [10] to [14];

an ultraviolet oxidation apparatus; and an ion exchange apparatus in this order.

In this specification, the description "to" indicates a numerical range including numerical values before and after that description. In addition, the amounts added are all described on the basis of the active ingredient.

The present invention can provide the method and apparatus for producing water for pure water, with which agents can be efficiently added to water supplied for a reverse osmosis membrane.

In addition, the present invention can provide a method and a system for producing pure water, with which pure water with high water quality can be produced over a long period of time by efficiently adding agents to water supplied for a reverse osmosis membrane.

DETAILED DESCRIPTION

Figure 1:
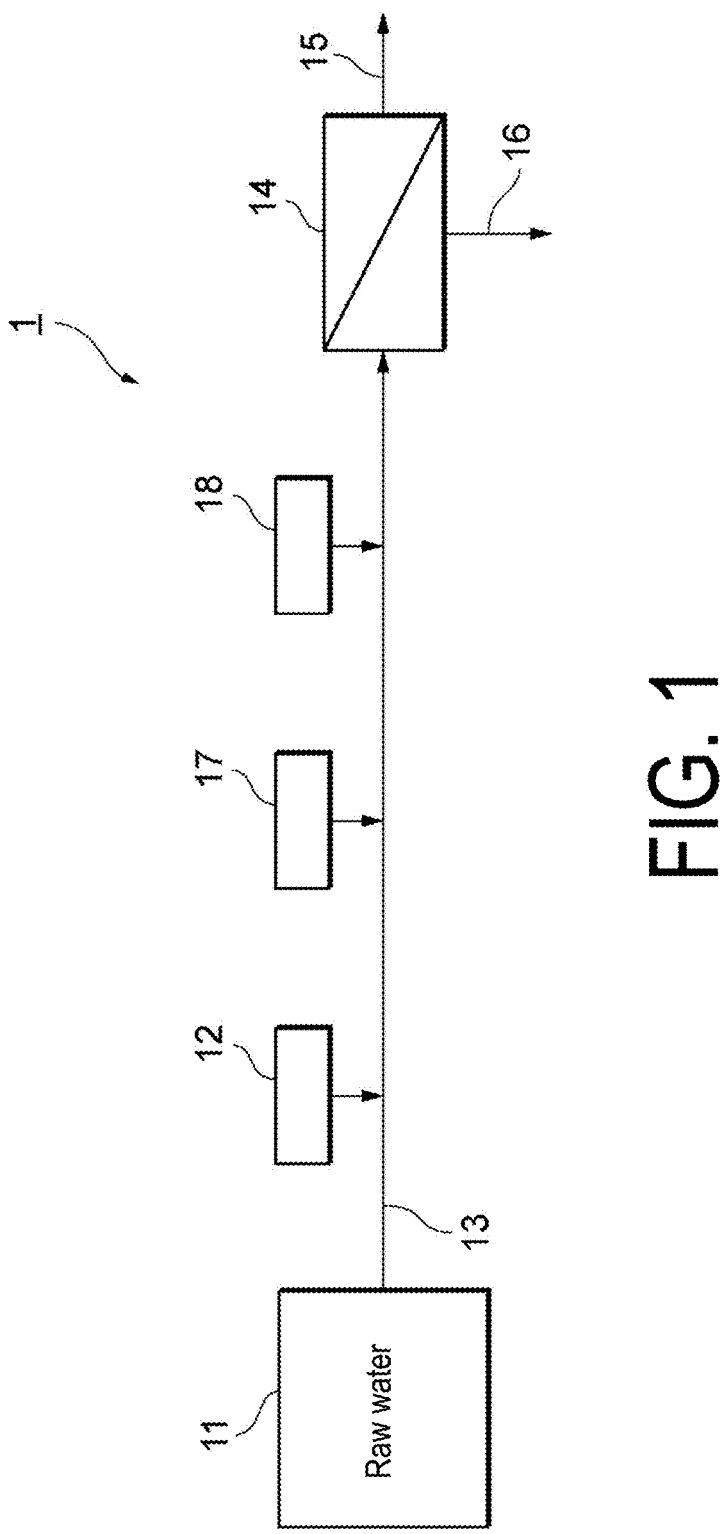
FIG. 1 is a diagram schematically illustrating a production apparatus used in a method for producing water for pure water according to an embodiment.

Embodiments of the present invention will be described below. FIG. 1 schematically illustrates a production apparatus 1 used in a method for producing water for pure water according to the present embodiment. The production apparatus 1 includes a raw water feeder 11 configured to supply raw water, a polyaluminum chloride feeder 12 configured to supply polyaluminum chloride (hereinafter also referred to as "PAC"), a raw water transfer pipe 13 configured to transfer the raw water, and a reverse osmosis membrane apparatus 14 configured to treat, with a reverse osmosis membrane, the raw water (first treated water) with the PAC added. The production apparatus 1 further includes a reducing agent feeder 17 configured to add a reducing agent to water supplied for the reverse osmosis membrane apparatus 14, and a disinfectant feeder 18 configured to add an oxidizing disinfectant to the supplied water with the reducing agent added. A transfer pipe 15 for permeate water is connected to the permeate side of the reverse osmosis membrane apparatus 14. A discharge pipe 16 for concentrated water is connected to the concentration side of the reverse osmosis membrane apparatus 14. The disinfectant feeder 18 is not essential and is provided as necessary.

A method for producing water for pure water according to an embodiment using the production apparatus 1 is as follows. First, raw water is supplied from the raw water feeder 11 into the raw water transfer pipe 13. The raw water is municipal water, such as city water or industrial water; or natural water, such as river water, lake water, groundwater, or well water. The raw water contains free chlorine. Alternatively, free chlorine may be added to the raw water during the transfer through the raw water transfer pipe 13. As for the water quality of the raw water, the raw water has, for example, a turbidity of 1 NTU to 100 NTU, a suspended solids amount (SS) of 5 mg/L to 500 mg/L, a total organic carbon (TOC) of 0.5 mg/L to 7 mg/L, an aluminum concentration of 0.01 mg/L to 5 mg/L, a free chlorine concentration of 0.1 mg/L to 2 mg/L as $Cl_2$, and a pH of 4 to 9. The raw water feeder 11 includes, for example, a raw water tank configured to store raw water and a water supply pump configured to transfer the raw water in the raw water tank, and the water supply pump is configured to supply the raw water in the raw water tank into the raw water transfer pipe 13. To pretreat the raw water before subsequent addition of high basicity PAC according to the water quality of the raw water, a prefilter (not illustrated) may be attached as a pretreatment apparatus. In addition, acid or alkali injection equipment for adjusting the pH of the raw water may be attached as necessary.

Then, the polyaluminum chloride feeder 12 adds PAC into the raw water transfer pipe 13. The polyaluminum chloride feeder 12 includes, for example, a chemical solution tank configured to store PAC and a chemical injection pump configured to add the PAC in the chemical solution tank into the raw water transfer pipe 13, and the chemical injection pump is configured to measure an amount of the PAC in the chemical solution tank to achieve a given concentration and adds it into the raw water transfer pipe 13. First treated water is thus produced.

At this time, a pH adjustment apparatus (not illustrated) adds an acid and/or an alkali, which is pH adjusters, to the raw water to adjust the pH of the raw water according to the basicity of the PAC. Either an acid or an alkali, or both may be added. In the case of using PAC with low basicity described later, the pH adjustment apparatus adds a pH adjuster into the raw water transfer pipe 13 to adjust the pH of the raw water before the PAC is added. The pH adjustment apparatus includes, for example, an acid storage tank configured to store an acid and an acid injection pump configured to add the acid in the acid storage tank into the raw water transfer pipe 13. In addition, the pH adjustment apparatus includes, for example, an alkali storage tank configured to store an alkali and an alkali injection pump configured to add the alkali in the alkali storage tank into the raw water transfer pipe 13. Then, the acid injection pump and the alkali injection pump are configured to measure amounts of the acid in the acid storage tank and the alkali in the alkali storage tank to provide a given pH of the raw water and add the measured amounts of acid and alkali into the raw water transfer pipe 13. The acid used here is typically sulfuric acid and the alkali is typically sodium hydroxide (aqueous solution).

The PAC in the present embodiment contains polyaluminum chloride represented by Chemical Formula (1) below. For the PAC according to the present embodiment, either PAC with low basicity or PAC with high basicity can be used. For the PAC according to the present embodiment, either PAC with low basicity or PAC with high basicity is preferably used. In the case of using PAC with low basicity (hereinafter referred to as "low basicity PAC"), the pH adjustment apparatus described above is preferably provided to adjust the pH of the raw water. The basicity is a value calculated by $n/6 \times 100(\%)$.

$$[Al_2(OH)_nCl_{6-n}]_m \ (1 \leq n \leq 5, m \leq 10) \tag{1}$$

The low basicity PAC preferably has a basicity of 75% or less and more preferably 60% or more and 70% or less. The low basicity PAC can be produced by a method described, for example, in JP 2009-203125 A. For the low basicity PAC, only one type of low basicity PAC may be used, or two or more types of low basicity PAC may be used in combination. In the case of using two or more types of low basicity PAC in combination, the basicities of the two or more types of low basicity PAC may be the same or different, and the basicities of all types of the low basicity PAC to be used are preferably 75% or less and more preferably 60% or more and 70% or less.

The amount of the low basicity PAC is preferably 0.03 mg/L as $Al_2O_3$ or more relative to a turbidity of 1 NTU in the raw water. Specifically, the amount of the low basicity PAC is preferably in an amount of 0.05 mg/L as $Al_2O_3$ or more and 5 mg/L as $Al_2O_3$ or less and more preferably in an amount of 0.1 mg/L as $Al_2O_3$ or more and 2 mg/L as $Al_2O_3$ or less relative to the amount of raw water.

In the present embodiment, PAC with high basicity (hereinafter referred to as "high basicity PAC") is preferably used for the PAC. The basicity of the high basicity PAC is preferably more than 75% and more preferably more than 83%. The upper limit of the basicity is usually approximately less than 84%. The high basicity PAC can be produced, for example, by a method described in JP 4104773 B. For the high basicity PAC, only one type of high basicity PAC may be used, or two or more types of high basicity PAC may be used in combination. In the case of using two or more types of high basicity PAC in combination, the basicities of the two or more types of high basicity PAC may be the same or different, and the basicities of all types of the high basicity PAC to be used are preferably more than 75% and more preferably more than 83%.

When high basicity PAC is used, suspended matter and the like in the raw water interact with the high basicity PAC to form microfloc. Undergoing the formation of the microfloc significantly reduces the adhesion of residual aluminum to the membrane of the reverse osmosis membrane apparatus 14, and thus the performance of the reverse osmosis membrane apparatus can be maintained over a long period of time. The microfloc is an aggregate of suspended matter and the like and high basicity PAC, the aggregate having a size of approximately 1 to 10 μm. The high basicity PAC is likely to form microfloc but is less likely to form coarse floc, which is larger than microfloc, or floc (nanofloc) finer than microfloc. An aluminum ion hardly leaks from the microfloc. Thus, undergoing the formation of the microfloc can prevent clogging of the reverse osmosis membrane for a long period of time.

For the high basicity PAC, aluminum chloride pentahydroxide ($Al_2Cl(OH)_5$) is preferably used. Aluminum chloride pentahydroxide is polyaluminum chloride in which n=5 and m=1 in Chemical Formula (1) and has a basicity of 83.3%. Aluminum chloride pentahydroxide is likely to form more homogeneous microfloc. This is probably due to the high basicity and low molecular weight of aluminum chloride pentahydroxide.

The amount of the high basicity PAC is preferably 0.125 mg/L as $Al_2O_3$ or more relative to a turbidity of 1 NTU in the raw water. Specifically, the amount of the high basicity PAC is preferably in an amount of 0.25 mg/L as $Al_2O_3$ or more and 5 mg/L as $Al_2O_3$ or less and more preferably in an amount of 0.3 mg/L as $Al_2O_3$ or more and 3 mg/L as $Al_2O_3$ or less relative to the amount of raw water. In particular, in the case of using aluminum chloride pentahydroxide ($Al_2Cl(OH)_5$) as the high basicity PAC, the amount of aluminum chloride pentahydroxide is preferably in an amount of 0.25 mg/L as $Al_2O_3$ or more and 2 mg/L as $Al_2O_3$ or less relative to the total amount of raw water. The high basicity PAC even in a small amount as described above can microflocculate the suspended matter in the raw water. In addition, the high basicity PAC functions even in a small amount as described above and thus makes it easier to prevent clogging of the reverse osmosis membrane apparatus 14 in the subsequent stage. The description "as $Al_2O_3$" indicates that the value is converted to aluminum oxide ($Al_2O_3$) concentration.

Figure 2:
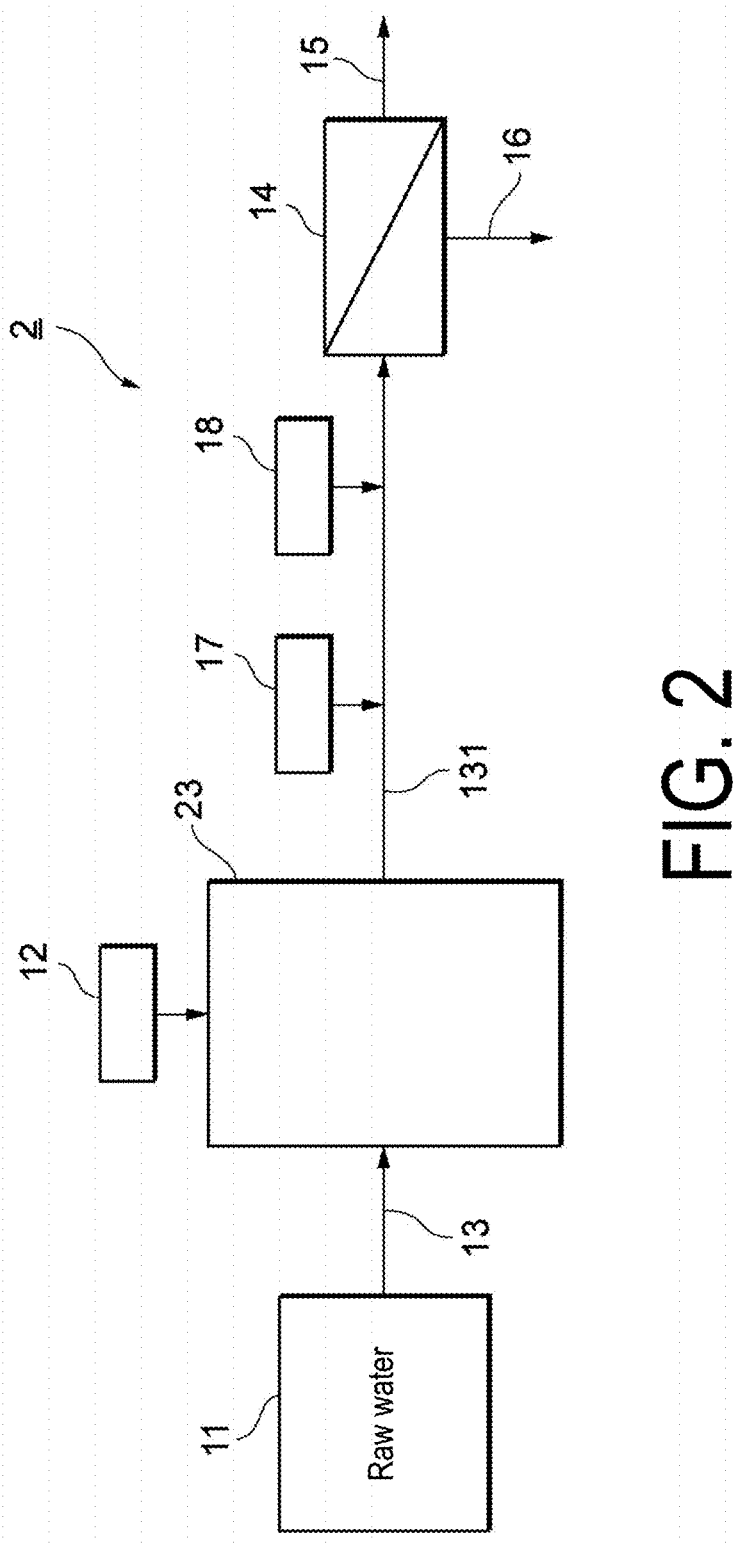
FIG. 2 is a diagram schematically illustrating a production apparatus further including a mixing tank in addition to the production apparatus illustrated in FIG. 1.

FIG. 2 schematically illustrates a production apparatus 2 for producing water for pure water, which includes a mixing tank 23 for adding PAC to raw water. The production apparatus 2 is different from the production apparatus 1 described above in that the production apparatus 2 includes a mixing tank 23 on the path of the raw water transfer pipe 13, and a transfer pipe 131 configured to supply treated water in the mixing tank 23 to the subsequent stage, and the reducing agent feeder 17 and the disinfectant feeder 18 are connected to the path of the transfer pipe 131, but other configurations are the same. In the present embodiment, detailed description of configurations and functions that are common to those of the production method using the production apparatus 1 will be omitted.

In the production apparatus 2, raw water and PAC are supplied into the mixing tank 23 from the raw water feeder 11 and from the polyaluminum chloride feeder 12, respectively. In the case of using low basicity PAC, the pH adjustment apparatus is configured to supply an acid and/or an alkali into the mixing tank 23. First treated water is thus produced.

In the case of using high basicity PAC, an acid and/or an alkali needs not be added by a pH adjustment apparatus because aggregation properties of the high basicity PAC is less pH-dependent. In addition, in the case of using high basicity PAC, suspension in the raw water interacts with the high basicity PAC in the mixing tank 23 to form microfloc. For the order of supply into the mixing tank 23, either the raw water or the PAC may be supplied first, or both may be supplied simultaneously. Preferably, the PAC and, as necessary, an acid and an alkali are added to the mixing tank 23 to which the raw water has been supplied.

In the mixing tank 23 of the production apparatus 2 illustrated in FIG. 2, in the case of using high basicity PAC, rapid stirring of the raw water and the high basicity PAC facilitates the formation of more homogeneous microfloc without formation of nanofloc. The stirring speed is, for example, preferably 150 $s^{-1}$ or more, more preferably from 150 to 250 $s^{-1}$, and even more preferably 250 $s^{-1}$ or more in terms of the G value. The stirring time with a rapid stirrer is 2 minutes or more, preferably 3 minutes or more, and more preferably 6 minutes or more. The rapid stirring with a greater G value can shorten the stirring time.

Subsequently, the first treated water is supplied to the raw water transfer pipe 13 of FIG. 1 or the transfer pipe 131 of FIG. 2. In a process in which the first treated water flows through the raw water transfer pipe 13 (or the transfer pipe 131, hereinafter the same in the present embodiment), the reducing agent feeder 17 is configured to add a reducing agent to the first treated water. Second treated water is thus produced.

The reducing agent feeder 17 includes, for example, a chemical solution tank configured to store a reducing agent and a chemical injection pump configured to add the reducing agent in the chemical solution tank into the raw water transfer pipe 13, and the chemical injection pump is configured to measure a given amount of the reducing agent in the chemical solution tank and add the reducing agent into the raw water transfer pipe 13.

The reducing agent used in the production apparatus 1 according to the present embodiment (or the production apparatus 2, hereinafter the same in the present embodiment) contains sodium disulfite ($Na_2S_2O_5$) as an active ingredient. The present inventors have found that in the case of using sodium disulfite as a reducing agent, the amount of the reducing agent remaining after the reaction with free chlorine is extremely small regardless of the pH value of the raw water. Thus, the amount of the oxidizing disinfectant to be subsequently added can be reduced. In particular, with combined use of sodium disulfide with high basicity PAC, the pH adjustment of the raw water can be omitted. Thus, the added amounts of agents, such as a pH adjuster, a reducing agent, and a disinfectant, and the associated workload can be significantly reduced. In particular, even if the pH changes, the residual amount of the reducing agent does not change, in other words, the residual chlorine does not change in case of sodium disulfite. Thus, in the case of using a high basicity PAC and not adjusting the pH in the treatment in the preceding stage, using sodium disulfite can avoid, for example, clogging of the reverse osmosis membrane with bacteria due to shortage of the disinfectant, deterioration of the reverse osmosis membrane due to shortage of the reducing agent, and the like otherwise caused by the effect of pH change. In addition, the amount of the residual reducing agent is negligible, thus, even in a method of monitoring the residual chlorine amount and adding the optimum amount to be added for the residual chlorine amount, the optimum amount to be added is easily determined. The reducing agent contains, for example, water as a solvent in addition to the active ingredient and may additionally contain a stabilizer and the like.

On the other hand, in the case of using sodium sulfite ($Na_2SO_3$) or sodium hydrogen sulfite ($NaHSO_3$) as the reducing agent, the residual amount of the reducing agent is large in the entire pH range and varies depending on the pH value. Although the reason is not necessarily clear, sodium sulfite ($Na_2SO_3$) and sodium hydrogen sulfite ($NaHSO_3$) are in an equilibrium state with each other, and adding sodium sulfite ($Na_2SO_3$) or sodium hydrogen sulfite ($NaHSO_3$) to the raw water allows equilibrium shift reaction to proceed due to pH change. At the same time, a redox reaction occurs between sodium sulfite ($Na_2SO_3$) and sodium hydrogen sulfite ($NaHSO_3$) and free chlorine. Thus, the redox reaction rate is slower than the equilibrium shift reaction depending on the pH of the raw water, and thus this is expected to increase the amounts of sodium sulfite ($Na_2SO_3$) and sodium hydrogen sulfite ($NaHSO_3$) added. Furthermore, the amount of increase in the amount added may be affected by the amount of the oxidizing agent, the scale of the apparatus, the difference in the stirring speed after the addition of the reducing agent, and the like. Thus, even if the pH of the raw water is the same, the amount of increase in the amount added is not necessarily constant, thus making it difficult to set an appropriate amount to be added.

In the production apparatus 1 according to the present embodiment, the amount of the reducing agent added is preferably from 0.1 mg/L to 5 mg/L as the amount of the active ingredient (sodium disulfite) although it depends on the free chlorine concentration in the raw water. In particular, in the case where the free chlorine concentration is approximately 0.2 mg/L as $Cl_2$, the amount of the active ingredient (sodium disulfite) can be set to 0.2 mg/L to 0.4 mg/L, and the amount of the residual reducing agent can be reduced to, for example, 0.06 mg/L or less. In addition, the amount of the reducing agent added may be determined as follows. For example, the free chlorine concentration is monitored using an oxidation-reduction potentiometer (ORP meter), a residual chlorine meter, an $SO_2$ meter, or the like, and the amount of the reducing agent added can be adjusted according to the monitored amount. Furthermore, the residual amount of the reducing agent after the addition of the reducing agent may be monitored, and the amount of the reducing agent added may be feedback-controlled according to the monitored value. The reducing agent amount can be monitored by quantifying, for example, by a method in which a portion of the raw water with the reducing agent added is sampled as sample water, and dissolved oxygen concentrations obtained by irradiating the raw water and the sample water with ultraviolet light are compared with each other to determine the reducing agent amount in the sample water.

Subsequently, as necessary, the disinfectant feeder 18 adds an oxidizing disinfectant to the second treated water. The disinfectant feeder 18 includes, for example, a chemical solution tank configured to store an oxidizing disinfectant and a chemical injection pump configured to add the oxidizing disinfectant in the chemical solution tank into the raw water transfer pipe 13, and the chemical injection pump is configured to measure a given amount of the oxidizing disinfectant in the chemical solution tank and add the oxidizing disinfectant into the raw water transfer pipe 13.

For the oxidizing disinfectant, an oxidizing disinfectant other than a free chlorine-based oxidizing disinfectant can be used, and examples include oxidizing disinfectants such as amine-based compounds and sulfamic acid-based compounds. The oxidizing disinfectant may contain a halogen bonded to a sulfamic acid-based compound, such as sulfamoyl chloride or chlorosulfamic acid. In addition, the oxidizing disinfectant may be a disinfectant containing an isothiazoline-based compound, such as 5-chloro-2-methyl-4-isothiazolin-3-one and 2-methyl-4-isothiazolin-3-one (MIT); a bromic acid compound, such as sodium hypobromite; or 2,2-dibromo-3-nitrilopropionamide (DBNPA). The oxidizing disinfectant may contain a component in a stabilized halogen form and an excess of a sulfamic acid-based compound. This allows a stabilized halogen acid salt to be used as a disinfectant in addition to stabilized hypochlorous acid and stabilized hypobromous acid. For the oxidizing disinfectant, a commercially available product may be used, and examples of the commercially available product include Kuriverter IK110 available from Kurita Water Industries Ltd., Orpersion E266 Series available from Organo Corporation, Caisson WT available from Dow Chemical Co., Ltd., and Stabrex available from Nalco Company.

The amount of the disinfectant added is usually preferably an amount used for inhibiting the growth of bacteria, and it is preferable to determine the minimum inhibitory concentration (MIC) of bacteria contained in the raw water in advance and add the disinfectant in an amount reaching the MIC to about 5 times the MIC. In particular, in the present embodiment, the residual amount of the reducing agent is small, thus the loss of the oxidizing disinfectant due to the reducing agent is reduced. Thus, the reducing agent is used approximately in an amount reaching the MIC.

Subsequently, the second treated water with the disinfectant added is supplied to the reverse osmosis membrane apparatus 14 via the transfer pipe 13 and is treated with the reverse osmosis membrane. A permeate water of the reverse osmosis membrane apparatus 14 is thus produced. From the viewpoint of suppressing a decrease in the permeate flux in the reverse osmosis membrane apparatus 14, the feed water pressure to the reverse osmosis membrane apparatus 14 at this time is preferably from 0.5 MPa to 3 MPa, and the water recovery rate in the reverse osmosis membrane apparatus 14 is preferably from 75% to 95%. A scale inhibitor may be appropriately added to the second treated water immediately before the second treated water is supplied to the reverse osmosis membrane apparatus 14, and the second treated water may be supplied to the reverse osmosis membrane apparatus 14.

For the reverse osmosis membrane apparatus 14, a reverse osmosis membrane apparatus of a super ultra-low pressure type, an ultra-low pressure type, a low pressure type, a medium pressure type, or a high pressure type may be used. The reverse osmosis membrane provided in the reverse osmosis membrane apparatus 14 is preferably a spiral reverse osmosis membrane made of an aromatic polyamide. In addition, examples of the reverse osmosis membrane apparatus 14 include a positively charged membrane with a positively charged reverse osmosis membrane surface, a negatively charged membrane with a negatively charged surface, and an uncharged membrane with an uncharged surface. Among these, the reverse osmosis membrane apparatus 14 is preferably a negatively charged membrane because it is less likely to cause clogging of the reverse osmosis membrane due to floc. The reverse osmosis membrane apparatus 14 is preferably a negatively charged membrane of ultra-low pressure or low pressure type. For the reverse osmosis membrane apparatus having a negatively charged membrane of ultra-low pressure or low pressure type, a commercially available product thereof can be used; for example, an "ES20" available from Nitto Denko Corporation, an "SU Series", a "TM Series", a "TBW Series", or the like available from Toray Industries, Inc., or a "BW Series" available from Dow Company can be used.

The permeate water of the reverse osmosis membrane apparatus 14 is transferred to the subsequent stage via the transfer pipe 15 on the permeate side of the reverse osmosis membrane apparatus 14. The concentrated water of the reverse osmosis membrane apparatus 14 is discharged to the outside of the system of the production apparatus 1 via the discharge pipe 16 or is returned to the stage before the reverse osmosis membrane apparatus 14 and can be reprocessed. The thus obtained permeate water of the reverse osmosis membrane apparatus 14 has a water quality, for example, of a turbidity of 0.01 NTU to 0.2 NTU, an aluminum concentration of 0 mg/L to 0.002 mg/L, a pH of 5.9 to 6.5, and an electrical conductivity of 30 µS/cm to 100 µS/cm.

Figure 3:
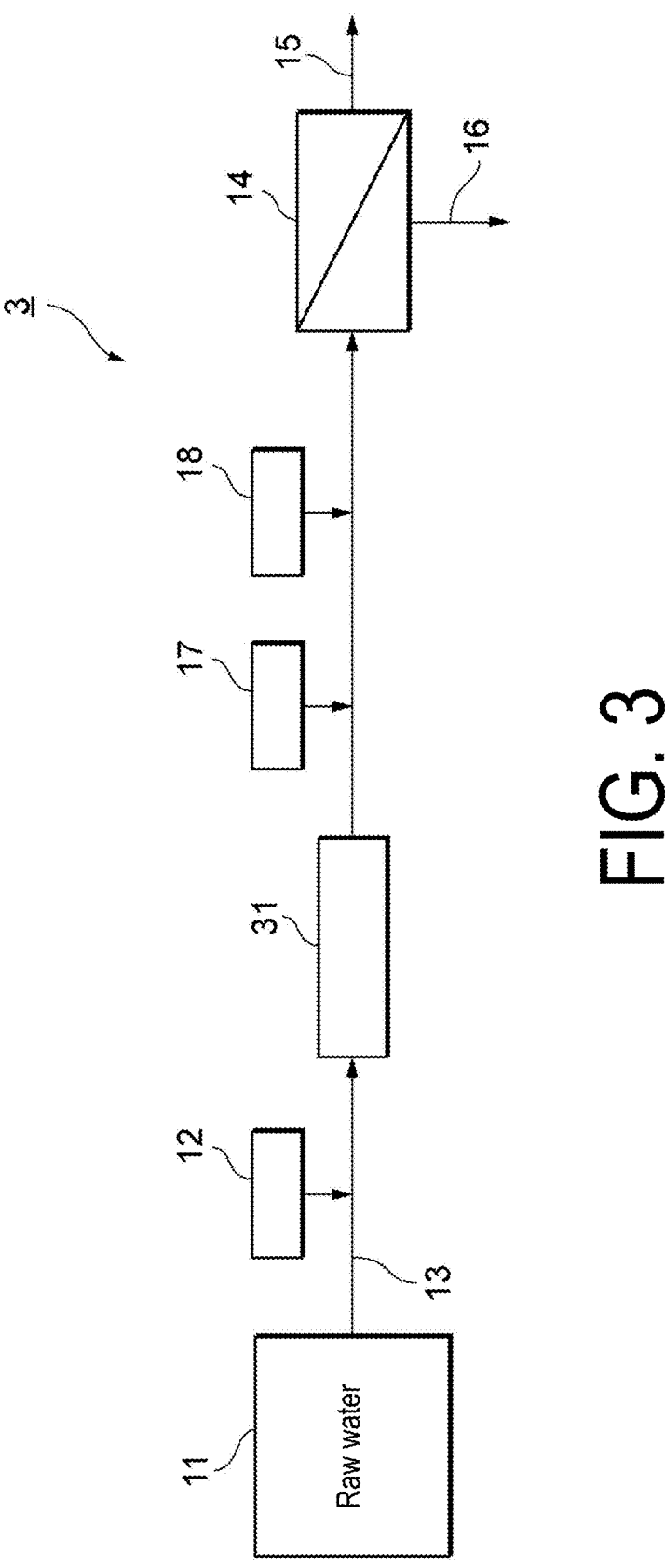
FIG. 3 is a diagram schematically illustrating a production apparatus used in a method for producing water for pure water according to another embodiment.

Next, another embodiment of the present invention will be described. FIG. 3 schematically illustrates a production apparatus 3 used in a method for producing water for pure water according to the present embodiment. The production apparatus 3 is different from the production apparatus 1 illustrated in FIG. 1 in that a filtration unit 31 is provided between the polyaluminum chloride feeder 12 and the reducing agent feeder 17 on the path of the raw water transfer pipe 13, but other configurations are the same. In the present embodiment, detailed description of configurations and functions that are common to those of the production method using the production apparatus 1 will be omitted.

A method for producing water for pure water according to an embodiment using the production apparatus 3 illustrated in FIG. 3 is as follows. First, raw water is supplied from the raw water feeder 11 into the raw water transfer pipe 13. Then, the polyaluminum chloride feeder 12 adds PAC into the raw water transfer pipe 13 into which the raw water has been supplied. A preferred aspect of the PAC used here is the same as that in the production method using the production apparatus 1 illustrated in FIG. 1.

In the case of using high basicity PAC, the raw water and the high basicity PAC are supplied into the raw water transfer pipe 13, and thus the suspension in the raw water has interacts with the high basicity PAC to form microfloc. Undergoing formation of the microfloc significantly reduces the adhesion of residual aluminum to the membrane of the reverse osmosis membrane apparatus 14, and thus the performance of the reverse osmosis membrane apparatus can be maintained over a long period of time.

The first treated water in the raw water transfer pipe 13 is supplied to the filtration unit 31. At this time, the raw water transfer pipe 13 is provided with a water supply pump, and the first treated water can be supplied to the filtration unit 31 by the water supply pump. In the present embodiment, a mixing tank is not used, and thus the production apparatus is compactified. Thus, the present embodiment has an advantage of facilitating the installation in a semiconductor manufacturing factory or the like. In addition, installing an in-line mixer or the like in the raw water transfer pipe 13 after the supply of the PAC to promote the mixing further suppresses clogging of the equipment in the subsequent stages.

The filtration unit 31 includes one or more types of filtration apparatuses selected from a sand filtration apparatus, a multimedia filter (MMF) filtration apparatus, an ultrafiltration apparatus, and a microfiltration (MF) apparatus, to filter the first treated water. Thus, microfloc mainly containing suspended matter in the water is removed. The treated water of the filtration unit 31 is sent to the subsequent stage through piping.

The sand filtration apparatus includes, for example, supporting gravel or sand (filter sand) as a filter material.

The multimedia filter (MMF) filtration apparatus includes, for example, a filter material with a three-layer structure in which anthracite, sand, and garnet are stacked in ascending order of particle size from the bottom.

The ultrafiltration (UF) apparatus includes an ultrafiltration membrane with a nominal pore size of 0.001 to 0.1 µm as a filter material and may be either a dead-end filtration system or a cross-flow filtration system. The ultrafiltration (UF) apparatus is preferably an external pressure-type ultra-filtration apparatus using a hollow fiber membrane.

The microfiltration (MF) apparatus includes, for example, a microfiltration membrane with a nominal pore size of 0.1 to 5 µm and can perform dead-end filtration.

The filtration unit 31 can have one type alone or two or more types in combination of filtration apparatuses selected from the sand filtration apparatus, the multimedia filter (MMF) filtration apparatus, the microfiltration (MF) apparatus, and the ultrafiltration (UF) apparatus described above according to the raw water quality. In the case of combining two or more types, the filtration unit 31 preferably includes a sand filtration apparatus and/or a multimedia filter (MMF) filtration apparatus disposed upstream and an ultrafiltration apparatus disposed downstream. The filtration unit 31 more preferably includes an ultrafiltration apparatus and more preferably includes only an ultrafiltration apparatus. Providing the filtration unit 31 allows suspended matter and the like in the first treated water to be removed with high accuracy, and thus reduces the load on the reverse osmosis membrane apparatus 14 in the subsequent stage. Thus, permeate water with high water quality can be obtained over a long period of time.

In the production apparatus 3 illustrated in FIG. 3, the filtration unit 31 is a stand-alone filtration unit having a stand-alone filtration apparatus. Examples of the stand-alone filtration apparatus include a cartridge filtration apparatus and a module filtration apparatus. The cartridge filtration apparatus is configured, for example, to accommodate a cartridge of a filter material in a housing and connect piping to a water passage inlet and a water discharge outlet opened in the housing to pass the water to the cartridge through the openings. The cartridge filtration apparatus has an advantage in that only the cartridge can be replaced when the filter material deteriorates. The module filtration apparatus is configured to provide a filter material inside a housing and connect the module to piping to pass the water through the filter material. The module filtration apparatus has an advantage in that when the filter material deteriorates, the entire module can be replaced, and the deteriorated filter material can be washed and regenerated for each module. The stand-alone filtration unit 31 reduces the downstream outflow of nanofloc and thus is effective in terms of preventing clogging of the reverse osmosis membrane apparatus 14. Nanofloc is floc finer than microfloc and tends to cause clogging of the reverse osmosis membrane. In particular, in the case of using the method according to the present embodiment to produce ultrapure water for production of semiconductors and the like, using a plurality of stand-alone filtration units 31 allows the continuous production of ultra-pure water without stopping the apparatuses by arranging the plurality of stand-alone filtration units 31 in parallel, performing regeneration, such as backwashing, and module replacement one by one among the plurality of filtration units 31, and continuing the operation with another or other units (what is called merry-go-round operation).

The thus obtained treated water of the filtration unit 31 has a water quality, for example, of a turbidity of 0.01 NTU to 0.4 NTU, an aluminum concentration of 0.01 mg/L to 0.04 mg/L, a pH of 7.2 to 8.3, and an electrical conductivity of 140 µS/cm to 270 µS/cm. In the case of using high basicity PAC, uniform microfloc can be stably formed regardless of the pH value of the raw water, to which the high basicity PAC is to be added. Therefore, there is no need to add a pH adjuster to the mixed tank 23 and the amounts of chemicals used can be reduced. Thus, although the pH of the treated water of the filtration unit 31 may change, the aluminum concentration remains low and stable.

Figure 4:
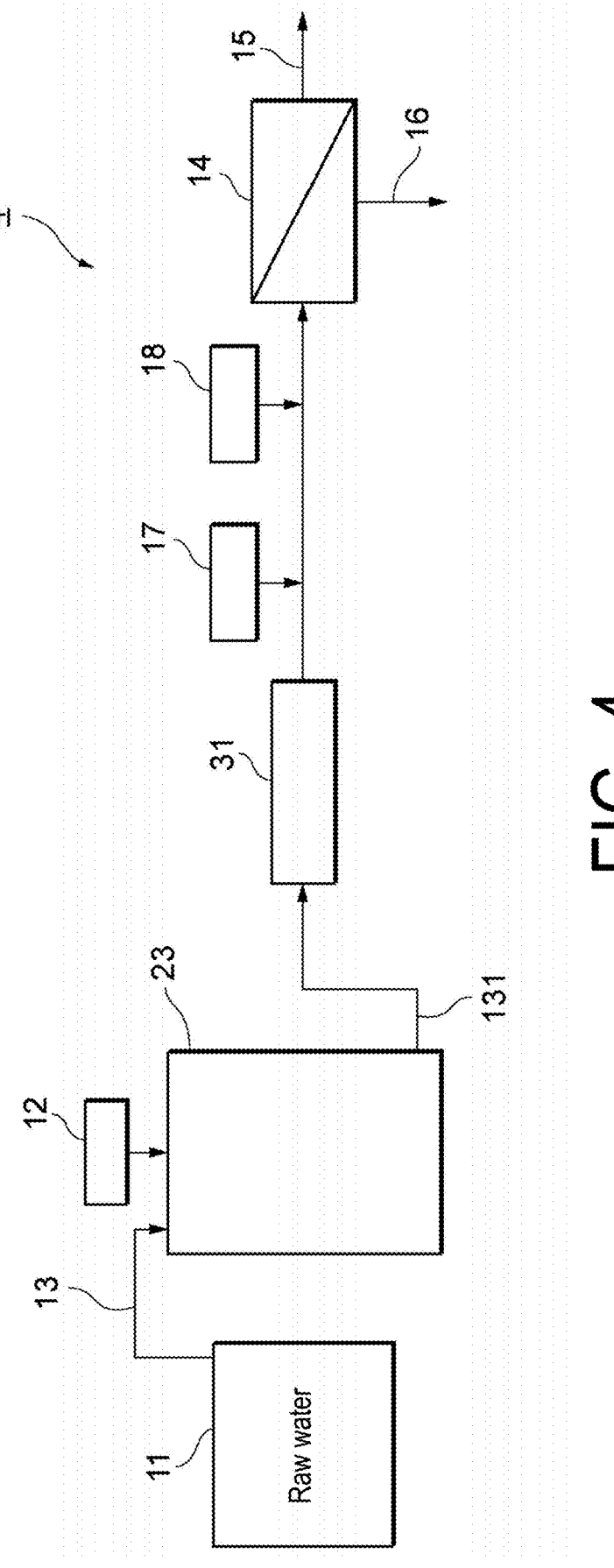
FIG. 4 is a diagram schematically illustrating a production apparatus further including a mixing tank in addition to the production apparatus illustrated in FIG. 3.

FIG. 4 schematically illustrates a production apparatus 4 for producing water for pure water, which includes the mixing tank 23 for adding PAC to raw water and the filtration unit 31. The production apparatus 4 is different from the production apparatus 3 illustrated in FIG. 3 in that the production apparatus 4 includes the mixing tank 23 on the path of the raw water transfer pipe 13, and the transfer pipe 131 configured to supply water in the mixing tank 23 to the subsequent stage, and the filtration unit 31, the reducing agent feeder 17, and the disinfectant feeder 18 are sequentially provided to the path of the transfer pipe 131, but other configurations are the same. In the present embodiment, detailed description of configurations and functions that are common to those of the production method using the production apparatus 3 will be omitted.

In the production apparatus 4, into the mixing tank 23, raw water is supplied from the raw water feeder 11 and PAC is supplied from the polyaluminum chloride feeder 12. In the case of using low basicity PAC, the pH adjustment apparatus is configured to supply an acid and an alkali into the mixing tank 23. First treated water is thus produced.

In the case of using high basicity PAC, an acid and/or an alkali needs not be added with a pH adjustment apparatus. In the case of using high basicity PAC, suspension in the raw water interacts with the high basicity PAC in the mixing tank 23 to form microfloc. In particular, using the mixing tank 23 allows sufficient formation of microfloc with the high basicity PAC and thus further suppresses clogging of the equipment in the subsequent stages. In this case, for the order of supply into the mixing tank 23, either the raw water or the high basicity PAC may be supplied first, or both may be supplied simultaneously, and preferably the high basicity PAC is added to the mixing tank 23 to which the raw water has been supplied.

The production apparatus 4 illustrated in FIG. 4 includes a stand-alone filtration unit 31 that is separated from and independent of the mixing tank 23 in the subsequent stage of the mixing tank 23. The aspect of the stand-alone filtration unit 31 is the same as that of the production apparatus 3 described above.

In addition, for the filtration unit 31, an immersion filtration apparatus configured for tank immersion can be used. The immersion filtration apparatus configured for tank immersion is immersed in the bottom of the mixing tank 23 and has an advantage of being able to directly filter the first treated water with PAC added with the filtration apparatus without using piping. The immersion filtration apparatus is preferably an ultrafiltration apparatus or an MMF filtration apparatus. In the production apparatus 4 according to the present embodiment, in particular, in the case of using high basicity PAC, forming mainly microfloc in water allows direct filtration of the PAC without undergoing sedimentation removal in a coagulation sedimentation tank. Thus, the filtration unit 31 can be immersed and integrated in the mixing tank 23, which can simplify the configuration of the entire apparatus.

In the case of using a plurality of filtration apparatuses in the filtration unit 31, only the immersion type or only the stand-alone type may be used, or the immersion type and the stand-alone type may be used in combination. In the present embodiment, only a stand-alone filtration apparatus is preferably used, and a stand-alone ultrafiltration apparatus is more preferably used.

Examples of the ultrafiltration membrane provided in the stand-alone ultrafiltration apparatus include a hollow fiber membrane, a spiral membrane, and a flat membrane made of cellulose acetate, an aromatic polyamide, poly(vinyl alcohol), polysulfone, or poly(vinylidene fluoride), for example. Among these, the ultrafiltration membrane is preferably a hollow fiber membrane made of a fluorine-based material, such as poly(vinylidene fluoride) (PVDF) or poly(tetrafluoroethylene) (PTFE).

The filtration membrane provided in the immersion ultrafiltration apparatus is preferably a flat membrane made of ceramic or a fluorine-based material, such as poly(vinylidene fluoride) (PVDF) or poly(tetrafluoroethylene) (PTFE).

Filtering the first treated water with the filtration unit 31 illustrated in FIG. 3 or 4 removes microfloc and coarse floc containing suspended matter and the like in the water. Subsequently, the reducing agent feeder 17 is configured to add a reducing agent to the treated water of the filtration unit 31. Second treated water is thus produced. Furthermore, as necessary, the disinfectant feeder 18 is configured to add an oxidizing disinfectant to the second treated water, and then the second treated water with the oxidizing disinfectant added is supplied to the reverse osmosis membrane apparatus 14. Preferred aspects of the addition of the reducing agent and the addition of the oxidizing disinfectant are the same as those in the production apparatus 1 (FIG. 1) and the production apparatus 2 (FIG. 2) described above.

Figure 5:
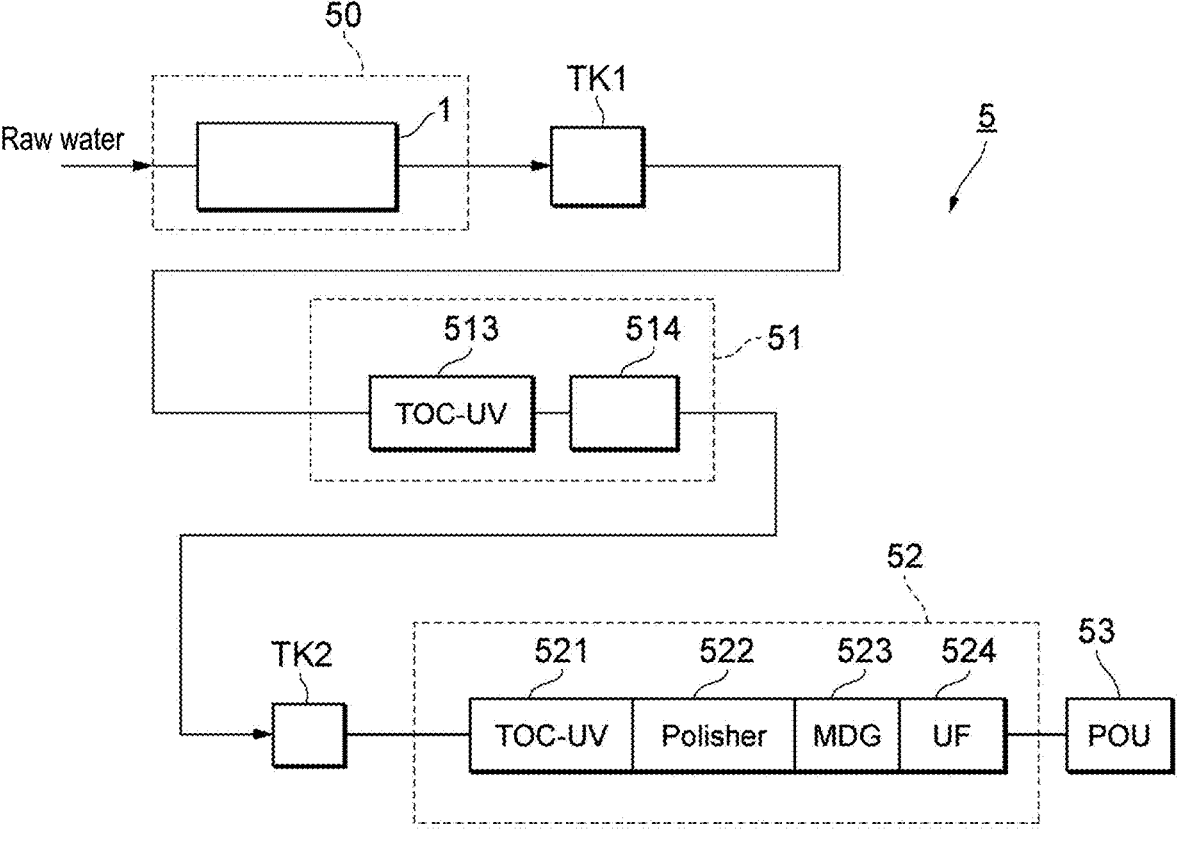
FIG. 5 is a diagram schematically illustrating a pure water production system using an apparatus for producing water for pure water according to an embodiment.

Next, a pure water production system 5 according to an embodiment using the production apparatus 1 described above will be described with reference to FIG. 5. FIG. 5 is a block diagram schematically illustrating a configuration of an ultrapure water production system 5 using the production apparatus 1. In FIG. 5, the production apparatus 1 can be changed to any of production apparatuses 2 to 4.

As illustrated in FIG. 5, the ultrapure water production system 5 includes a pretreatment system 50, a primary pure water system (pure water production system) 51 and a secondary pure water system (subsystem) 52 in this order. The secondary pure water system 52 is connected to a point of use (POU) 53 by piping, thereby supplying ultrapure water produced by the ultrapure water production system 5 to the POU 53.

The pretreatment system 50 includes the production apparatus 1 according to the embodiment described above and, as necessary, a prefilter, a heat exchanger for temperature adjustment, and/or the like.

The ultrapure water production system 5 includes a tank TK1 in the subsequent stage of the pretreatment system 50. The water to be treated that has been pretreated by the pretreatment system 50 is introduced into the tank TK1, temporarily stored, and then supplied to the primary pure water system 51.

The primary pure water system 51 is configured to remove organic matter, ionic components, and dissolved gas from the pretreated water to produce primary pure water. The primary pure water system 51 includes an ultraviolet oxidation apparatus (TOC-UV) 513 and an ion exchange apparatus 514 in this order.

The ultraviolet oxidation apparatus 513 includes, for example, an ultraviolet lamp that emits ultraviolet light with a wavelength at or near 185 nm and ultraviolet light with a wavelength at or near 254 nm and is configured to irradiate the water to be treated with ultraviolet light from the ultraviolet lamp to oxidize and decompose total organic carbon (TOC) in the water to be treated. By ultraviolet light emitted by the ultraviolet oxidation apparatus 513, the water is decomposed to produce OH radicals, and the OH radicals oxidize and decompose organic matter in the water to be treated into organic acids. The amount of ultraviolet irradiation by the ultraviolet oxidation apparatus 513 of the primary pure water system can be appropriately changed according to the water quality of the water to be treated.

The ion exchange apparatus 514 is one or more types of an ion exchange resin apparatus and an electrodeionization apparatus. For the ion exchange resin apparatus, one or more types selected from a cation exchange resin apparatus, an anion exchange resin apparatus, a mixed-bed ion exchange resin apparatus, and a double-bed ion exchange resin apparatus can be used in an appropriate combination according to the required water quality. The cation exchange resin used in the cation exchange resin apparatus may be a strongly acidic cation exchange resin or a weakly acidic cation exchange resin. The anion exchange resin used in the anion exchange resin apparatus may be a strongly basic anion exchange resin or a weakly basic anion exchange resin. For the ion exchange resin, a boron-adsorbing ion exchange resin may be used.

The primary pure water obtained by the primary pure water system 51 has, for example, a resistivity of 17M $\Omega$·cm or more and a TOC concentration of 10 $\mu$g C/L or less.

The ultrapure water production system 5 includes a primary pure water tank TK2 configured to store the primary pure water and the secondary pure water system 52 in this order in the subsequent stage of the primary pure water system 51. The primary pure water produced by the primary pure water system is temporarily stored in the primary pure water tank TK2 and then sent to the secondary pure water system 52. The secondary pure water system 52 includes an ultraviolet oxidation apparatus (TOC-UV) 521, a non-regenerative polisher 522, a membrane degasser (MDG) 523, and an ultrafiltration apparatus (UF) 524.

The configuration of the ultraviolet oxidation apparatus 521 in the secondary pure water system 52 is the same as that of the ultraviolet oxidation apparatus 513 of the primary pure water system 51. The non-regenerative polisher 522 is a mixed-bed ion exchange resin apparatus formed by mixing and packing a strongly acidic cation exchange resin and a strongly basic anion exchange resin in a container, such as a cylinder. The non-regenerative polisher 522 adsorbs and removes ionic components produced by decomposing organic matter by the ultraviolet oxidation apparatus 521.

The membrane degasser 523 removes dissolved gas through a degassing membrane. The membrane degasser 523 removes a trace amount of dissolved oxygen in the primary pure water to reduce the dissolved oxygen concentration, for example, to approximately 1 $\mu$g/L or less. The ultrafiltration apparatus 524 is configured to perform filtration with an ultrafiltration membrane and remove a trace amount of eluted material and fine particle components from the upstream ion exchange resin to reduce the number of fine particles, for example, of 0.05 $\mu$m or greater, to approximately 250 Pcs./L or less.

The secondary pure water system 52 is configured to treat the primary pure water to produce higher purity ultrapure water. The ultrapure water has a water quality, for example, of a total organic carbon (TOC) concentration of 1 $\mu$g C/L or less, a resistivity of 18 M$\Omega$·cm or more, and a boron concentration of 0.1 ppb ($\mu$g/L) or less. The ultrapure water produced by the secondary pure water system is supplied to the point of use 53.

In each embodiment described above, the water quality of the raw water and the treated water can each be measured by the following method or apparatus.

Turbidity: light scattering method

Aluminum concentration: inductively coupled plasma (ICP) emission spectrometry pH: electrode method Electrical conductivity: electrical conductivity meter (HE-960CW available from Horiba, Ltd.)

Total organic carbon (TOC) concentration: TOC meter (except for ultrapure water: Sievers M9e available from SUEZ)

EXAMPLES

Next, examples will be described. The present invention is not limited to the following examples.

Figure 6:
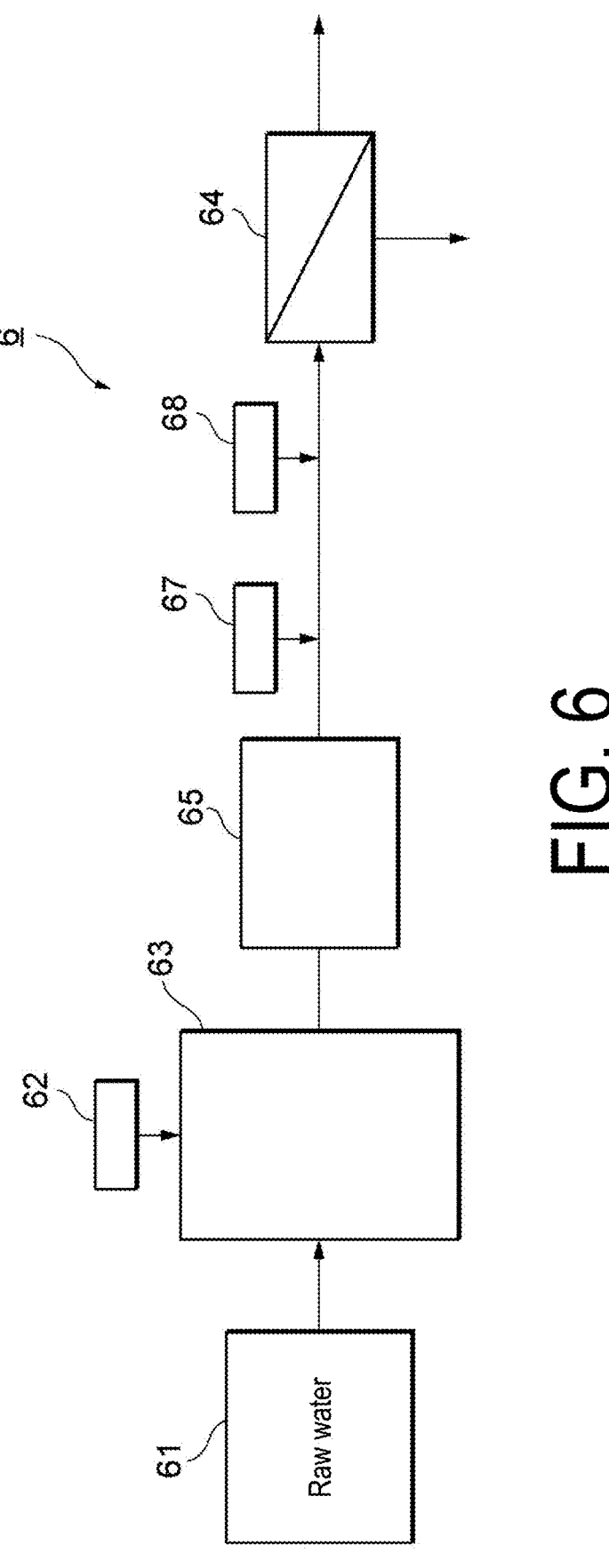
FIG. 6 is a diagram schematically illustrating an apparatus for producing water for pure water used in Examples.

FIG. 6 schematically illustrates a production apparatus 6 for producing water for pure water used in the present examples and comparative examples. The production apparatus 6 illustrated in FIG. 6 includes a raw water feeder 61 configured to supply raw water, a polyaluminum chloride feeder 62 configured to supply PAC, and a mixing tank 63 into which the raw water and the PAC are supplied. The production apparatus 6 further includes an ultrafiltration apparatus 65, a reducing agent feeder 67, a disinfectant feeder 68, and a reverse osmosis membrane apparatus 64 in this order in the downstream path of the mixing tank 63.

Specifications of each apparatus used in examples and experimental examples are as follows.

Mixing tank 63: volume 1 m$^3$

Ultrafiltration apparatus 65: Purear GL (FG module) available from Kuraray Co., Ltd. (PVDF membrane, nominal pore size 0.02 $\mu$m)

Reverse osmosis membrane apparatus 64: TM710 (low-pressure type, negatively charged membrane) available from Toray Industries, Inc.

Water recovery rate 85%, operating pressure 12 kgf/cm$^2$

Measurement of aluminum concentration: high frequency inductively coupled plasma (ICP) emission spectrometry Measurement of turbidity: turbidimeter (Hach 2100P, available from available from DKK-TOA Corporation)

Measurement of pH: water quality meter (Horiba 9630-10D, available from Horiba, Ltd.)

Residual chlorine concentration or total chlorine concentration: AQ-201 (available from Sibata Scientific Technology Ltd.)

Sulfite ion (SO$_3^{2-}$) concentration (reducing agent amount): MD600 (available from LOVIBOND)

Free chlorine concentration: AQ-201 (available from SIBATA)

Water quality of raw water (lake water): turbidity 4 NTU, pH=7.2, electrical conductivity 250 $\mu$S/cm, TOC 4 mg/L. The pH changed in the range of 6.7 to 7.8 during a water passing period.

Example 1

Hypochlorous acid was added to raw water to give a concentration of free chlorine of 0.2 mg/L as Cl$_2$, and the mixed liquid was supplied to the mixing tank 63. Then, an aqueous solution of aluminum chloride pentahydroxide (Al$_2$Cl(OH)$_5$) (prototype from Nomura Micro Science Co., Ltd., basicity 83.33%) was supplied as high basicity PAC to the mixing tank 63 to give an aluminum concentration in the raw water of 1.2 mg/L in terms of Al$_2$O$_3$ concentration, and the mixture was stirred. After stirring, the raw water was sampled, 80 mL of the raw water was passed through a membrane (size 47 mm $\varphi$) with a nominal pore size of 0.2

µm, and the fine particles captured by the membrane were observed, which were fine particles of approximately 1 to 10 µm. The elemental composition of the fine particles were determined by energy dispersive X-ray fluorescence spectroscopy (EDX), and it was found that the fine particles contained Al. Furthermore, the same amount of the raw water was passed through a membrane (size 47 mm φ) with a nominal pore size of 0.45 µm, whereby almost no differential pressure is produced. From the above results, it was confirmed that microfloc was formed in the present example.

The treated water in the mixing tank 63 was passed through the ultrafiltration apparatus 65 and then sent to the subsequent stage by piping. In this process, 0.2 mg/L of sodium disulfite was added as a reducing agent, and then 0.3 mg/L of chlorosulfamic acid (Nomulite (prototype), available from Nomura Micro Science Co., Ltd.) was added as an oxidizing disinfectant. Subsequently, the treated water was supplied to the reverse osmosis membrane apparatus 64 and was treated with the reverse osmosis membrane. The added amount of sodium disulfite was the minimum amount (chemical equivalent) required when the following reaction was assumed to occur completely.

$$Na_2S_2O_5 + H_2O + 2NaOCl \rightarrow 2HCl + 2Na_2SO_4$$

Example 2

Treatment was continuously performed by the ultrafiltration apparatus 65 and the reverse osmosis membrane apparatus 64 in this order in the same manner as in Example 1 except for using high basicity PAC (basicity 76%) produced by the method described in JP 4104773 B as high basicity PAC. It was confirmed that microfloc was also formed in Example 2.

Example 3

Treatment was continuously performed by the ultrafiltration apparatus 65 and the reverse osmosis membrane apparatus 64 in this order in the same manner as in Example 1 except for adding a total of 0.05 mg/L of 5-chloro-2-methyl-4-isothiazolin-3-one and 2-methyl-4-isothiazolin-3-one (MIT) as oxidizing disinfectants. It was confirmed that microfloc was also formed in Example 3.

Example 4

An acid or alkali was added to raw water to maintain the pH at 7.2 and eliminate the pH change. In addition, treatment was continuously performed by the ultrafiltration apparatus 65 and the reverse osmosis membrane apparatus 64 in this order in the same manner as in Example 1 except for using low basicity PAC (trade name PAC250A, available from Taki Chemical Co., Ltd., basicity 50%) as PAC to give an aluminum concentration in the raw water of 0.3 to 0.4 mg/L in terms of $Al_2O_3$ concentration. In Example 4, the raw water after adding the low basicity PAC and stirring was sampled, 80 mL of the raw water was passed through a membrane (size 47 mm φ) with a nominal pore size of 0.2 µm, and the fine particles captured by the membrane were observed, which were fine particles of approximately 1 to 10 µm. The elemental composition of the fine particles were determined by EDX, and it was found that the fine particles contained Al. Furthermore, the same amount of the raw water was passed through a membrane (47 mm φ) with a nominal pore size of 0.45 µm, leading to rapid production of differential pressure. From the above results, it was confirmed that microfloc was formed, and coarse aggregates with a size of 0.45 µm or more were formed as well.

Comparative Example 1

Treatment was continuously performed by the ultrafiltration apparatus 65 and the reverse osmosis membrane apparatus 64 in this order in the same manner as in Example 1 except for using low basicity PAC (trade name PAC250A, available from Taki Chemical Co., Ltd., basicity 50%) as a PAC to give an aluminum concentration in the raw water of 0.3 to 0.4 mg/L in terms of $Al_2O_3$ concentration. In Comparative Example 1, the state of floc formation was the same as that in Example 4.

Comparative Example 2

Treatment was continuously performed by the ultrafiltration apparatus 65 and the reverse osmosis membrane apparatus 64 in this order in the same manner as in Comparative Example 1 except for adding 0.05 mg/L of 5-chloro-2-methyl-4-isothiazolin-3-one and 2-methyl-4-isothiazolin-3-one (MIT) as oxidizing disinfectants as same as in Example 3. The state of floc formation was equivalent to that in Comparative Example 1.

Comparative Example 3

Treatment was continuously performed by the ultrafiltration apparatus 65 and the reverse osmosis membrane apparatus 64 in this order in the same manner as in Example 1 except for using sodium sulfite as a reducing agent. In Comparative Example 3, the state of microfloc formation was the same as that in Example 1. The added amount of sodium sulfite was the minimum amount (chemical equivalent) required when the following reaction was assumed to occur completely.

$$NaOCl + Na_2SO_3 \rightarrow NaCl + Na_2SO_4$$

Comparative Example 4

Treatment was continuously performed by the ultrafiltration apparatus 65 and the reverse osmosis membrane apparatus 64 in this order in the same manner as in Example 1 except for using sodium hydrogen sulfite as a reducing agent. In Comparative Example 3, the state of microfloc formation was the same as that in Example 1. The added amount of sodium hydrogen sulfite was the minimum amount (chemical equivalent) required when the following reaction was assumed to occur completely.

$$2NaHSO_3 + 3NaClO \rightarrow 3NaCl + H_2O + 2Na_2SO_4$$

Table 1 shows the type and basicity of the PAC used, the type and added amount of the reducing agent, the type of oxidizing disinfectant, the aluminum concentration in the treated water of the ultrafiltration apparatus 65, the turbidity (NTU), and the residual reducing agent concentration in Example 1 to Comparative Example 4. In Table 1, the amount of the reducing agent is expressed by the amount of the active ingredient, and the residual amount of the reducing agent is expressed by the amount of sulfite ions ($SO_3^{2-}$). In Table 1, the mixture of 5-chloro-2-methyl-4-isothiazolin-3-one and 2-methyl-4-isothiazolin-3-one (MIT) is referred to as "disinfectant b".

Experimental Examples 1 to 3 shows that in the case of using sodium sulfite ($Na_2SO_3$) as the reducing agent and in the case of using sodium hydrogen sulfite ($NaHSO_3$) as the reducing agent, when the reducing agent was added until free chlorine disappeared, the reducing agent remained, and furthermore, the residual amount changed depending on the pH. On the other hand, in the case of using sodium disulfite

TABLE 1

| | Raw water Turbidity | PAC Basicity (%) | PAC Supply amount (mg/L as $Al_2O_3$) | Treated water of ultrafiltration apparatus Aluminum concentration (mg/L) | Treated water of ultrafiltration apparatus Turbidity | Reducing agent Type | Reducing agent Active ingredient amount (mg/L) | Oxidizing disinfectant Type | Oxidizing disinfectant Active ingredient amount (mg/L) | RO flow rate after 3 months (with initial RO flow rate of 100) |
|---|---|---|---|---|---|---|---|---|---|---|
| Example 1 | 4 | 83.3 | 1.2 | from 0.02 to 0.04 | 0.2 | $Na_2S_2O_5$ | 0.2 | Chlorosulfamic acid | 0.3 | 100 |
| Example 2 | 4 | 76 | 1.2 | from 0.02 to 0.04 | 0.2 | $Na_2S_2O_5$ | 0.2 | Chlorosulfamic acid | 0.3 | 100 |
| Example 3 | 4 | 83.3 | 1.2 | from 0.02 to 0.04 | 0.2 | $Na_2S_2O_5$ | 0.2 | Disinfectant b | 0.05 | 100 |
| Example 4 | 4 | 50 | 0.3 | from 0.04 to 0.15 | 0.2 | $Na_2S_2O_5$ | 0.2 | Chlorosulfamic acid | 0.3 | 100 |
| Comparative Example 1 | 4 | 50 | 0.3 | from 0.04 to 0.15 | 0.2 | $Na_2S_2O_5$ | 0.2 | Chlorosulfamic acid | 0.3 | 111 |
| Comparative Example 2 | 4 | 50 | 0.3 | from 0.04 to 0.15 | 0.2 | $Na_2S_2O_5$ | 0.2 | Disinfectant b | 0.05 | 108 |
| Comparative Example 3 | 4 | 83.3 | 1.2 | from 0.02 to 0.04 | 0.2 | $Na_2SO_3$ | 0.34 | Chlorosulfamic acid | 0.3 | 109 |
| Comparative Example 4 | 4 | 83.3 | 1.2 | from 0.02 to 0.04 | 0.2 | $NaHSO_3$ | 0.19 | Chlorosulfamic acid | 0.3 | 115 |

* Disinfectant b is a mixture of 5-chloro-2-methyl-4-isothiazolin-3-one and 2-methyl-4-isothiazolin-3-one (MIT).

From the comparison of Example 1 with Comparative Examples 3 and 4, it was shown that the permeation flux (flow rate) increased in Comparative Examples 3 and 4. This is considered that sodium sulfite ($Na_2SO_3$) was used in Comparative Example 3 and sodium hydrogen sulfite ($NaHSO_3$) was used in Comparative Example 4, thus a sufficient amount of the reducing agent is not provided in terms of the reaction equivalent with the oxidizing agent (free chlorine), leading to deterioration of the reverse osmosis membrane provided in the reverse osmosis membrane apparatus 64 in a short period of three months, and thus the permeation flux is increased.

Experimental Examples 1 to 3

The relationship between the type and residual amount of the reducing agents in changing the pH of the raw water was examined.

A given amount of raw water with a turbidity of 4 was collected in a beaker, and a pH adjuster (NaOH or $H_2SO_4$) was added thereto to adjust the pH to a given value of 6 to 9. Sodium hypochlorite (NaClO) was added to each pH-adjusted sample to give a concentration of free chlorine of 2 mg/L as $Cl_2$.

Then, a given amount (from 0 to 20 mg/L) of a reducing agent shown below was added until the free chlorine disappeared, and the $SO_3^{2-}$ concentration after the added amount of the reducing agent was measured.

Figure 7:
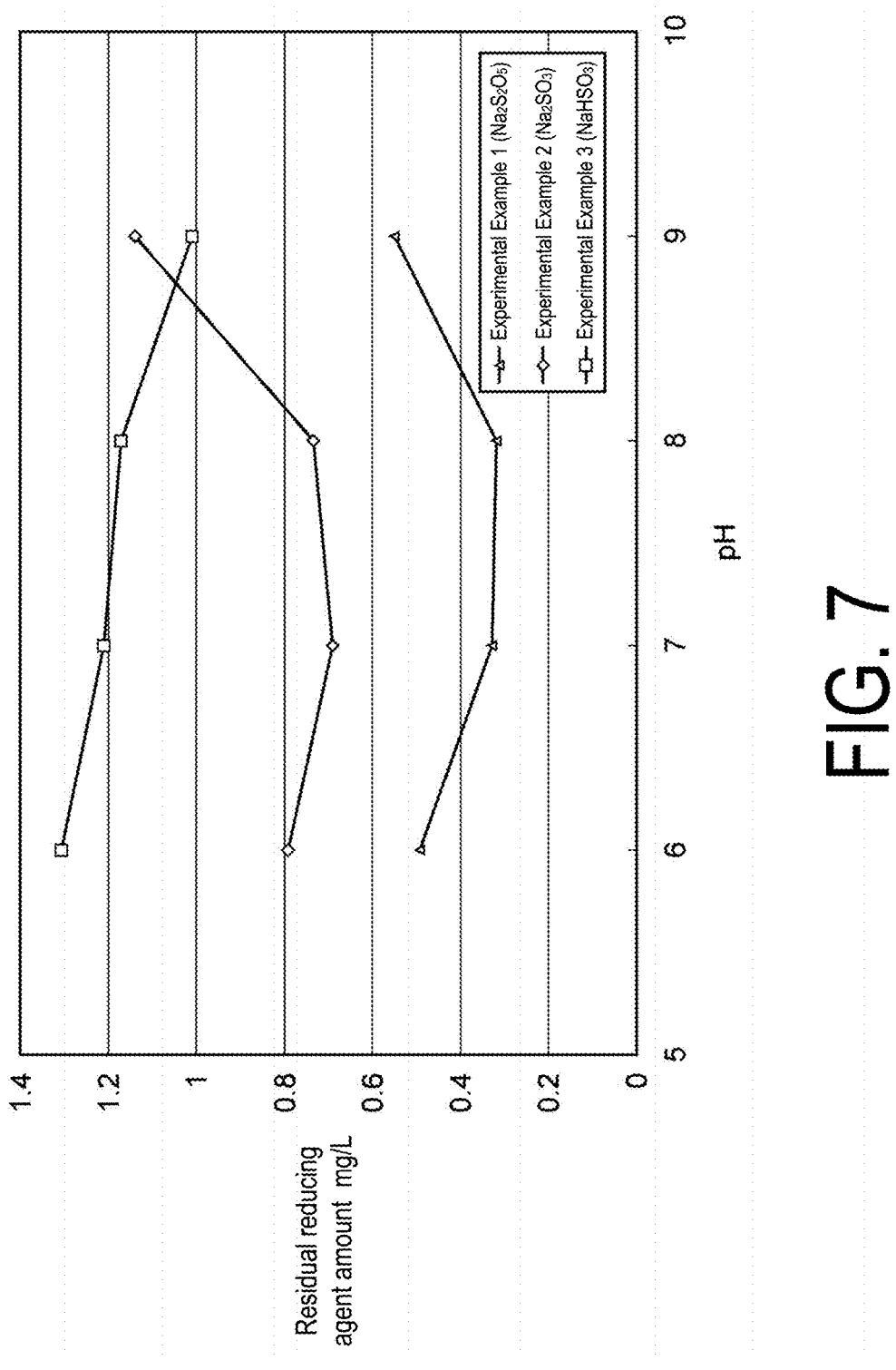
FIG. 7 is a graph showing the relationship between the pH of raw water and the residual reducing agent amount in experimental examples using sodium disulfite, sodium sulfite, and sodium hydrogen sulfite.

The residual amount of the reducing agent when free chlorine disappeared was determined from the difference between the added amount of the reducing agent and the consumption amount of the reducing agent determined from the reaction formula. The results are shown in FIG. 7.

Experimental Example 1: sodium disulfite ($Na_2S_2O_5$)
Experimental Example 2: sodium sulfite ($Na_2SO_3$)
Experimental Example 3: sodium hydrogen sulfite ($NaHSO_3$)

($Na_2S_2O_5$), the residual amount of the reducing agent was smaller than in the case of using sodium sulfite or sodium hydrogen sulfite, and the pH dependence of the residual amount was also low.

From the above-described experimental examples, examples, and comparative examples, the following was found. According to the embodiment of the apparatus and method for producing pure water, because sodium disulfite ($Na_2S_2O_5$) is used as the reducing agent, the residual amount of the reducing agent is expected to be smaller than those using sodium sulfite or sodium hydrogen sulfite, and the pH dependence of the residual amount is also expected to be low. Thus, in treating raw water containing chlorine with a reverse osmosis membrane, the apparatus and method achieve efficient addition of agents and can reduce the amounts of the agents added. This allows efficient production of high-purity pure water or ultrapure water over a long period of time. Thus, the apparatus and method for producing water for pure water according to the embodiment are suitable for mass production of pure water or ultrapure water.

REFERENCE SIGNS LIST 1 to 4 and 6 Apparatus for producing water for pure water, 5 Ultrapure water production system, 11, 61 Raw water feeder, 12, 62 Polyaluminum chloride feeder, 13 Raw water transfer pipe, 14, 64 Reverse osmosis membrane apparatus, 17, 67 Reducing agent feeder, 18, 68 Disinfectant feeder, 23, 63 Mixing tank, 31 Filtration unit, 65 Ultrafiltration apparatus, 50 Pretreatment system, 51 Primary pure water system (pure water production system), 52 Secondary pure water system (subsystem), 53 Point of use (POU), 513 Ultraviolet oxidation apparatus (TOC-UV), 514 Ion exchange apparatus, TK1, TK2 Tank, 521 Ultraviolet oxidation apparatus (TOC-UV), 522 Non-regenerative polisher, 523 Membrane degasser (MDG), 524 Ultrafiltration apparatus (UF)

The invention claimed is:

1. A method for producing purified water, comprising:

adding polyaluminum chloride to raw water containing free chlorine to obtain first treated water;

adding a reducing agent containing sodium disulfite as an active ingredient to the first treated water to obtain second treated water;

adding an oxidizing disinfectant to the second treated water; and treating the second treated water with a reverse osmosis membrane.

2. The method for producing purified water according to claim 1, wherein the first treated water containing microfloc is obtained by adding polyaluminum chloride with a basicity of more than 75% to the raw water.

3. The method for producing purified water according to claim 1, wherein the raw water has a turbidity of 1 NTU or more and 100 NTU or less.

4. The method for producing purified water according to claim 1, wherein the polyaluminum chloride includes aluminum chloride pentahydroxide, and an amount of the aluminum chloride pentahydroxide added is in an amount of 0.25 mg/L or more and 5 mg/L or less in terms of concentration of aluminum oxide ($Al_2O_3$) relative to the raw water.

5. The method for producing purified water according to claim 1, the further comprising:

filtering the first treated water by one or more selected from sand filtration, multimedia filter (MMF) filtration, a microfiltration (MF) apparatus, and ultrafiltration, wherein the reducing agent is added to the treated water obtained in the filtering the first treated water.

6. The method for producing purified water according to claim 1, wherein a free chlorine concentration in the raw water is 0.1 mg/L or more and 2 mg/L or less as $Cl_2$, and an amount of the reducing agent added is 0.1 mg/L or more and 5.0 mg/L or less in terms of an amount of sodium disulfite.

7. The method for producing purified water according to claim 1, wherein permeate water treated with the reverse osmosis membrane has a turbidity of 0.01 or more and 0.4 or less and an aluminum concentration of 0.01 mg/L or more and 0.04 mg/L or less.

8. The method for producing purified water according to claim 1, wherein the oxidizing disinfectant is at least one selected from the group consisting of a sulfamic acid-based compound, a sulfamic acid compound containing halogen, an isothiazoline-based compound, and a bromic acid compound.

9. A method for producing purified water, comprising:

adding polyaluminum chloride to raw water containing free chlorine to obtain first treated water;

adding a reducing agent containing sodium disulfite as an active ingredient to the first treated water to obtain second treated water;

adding an oxidizing disinfectant to the second treated water;

treating the second treated water with a reverse osmosis membrane;

ultraviolet oxidation; and ion exchanging in this order.

10. The method for producing purified water according to claim 9, wherein the oxidizing disinfectant is at least one selected from the group consisting of a sulfamic acid-based compound, a sulfamic acid compound containing halogen, an isothiazoline-based compound, and a bromic acid compound.

11. An apparatus for producing purified water, the apparatus comprising:

a raw water feeder configured to supply raw water containing free chlorine;

a polyaluminum chloride feeder configured to add polyaluminum chloride to the raw water;

a reducing agent feeder configured to add a reducing agent containing sodium disulfite as an active ingredient to first treated water obtained by adding polyaluminum chloride to the raw water;

a disinfectant feeder configured to add an oxidizing disinfectant to second treated water obtained by adding the reducing agent to the first treated water;

a reverse osmosis membrane apparatus configured to treat second treated water with a reverse osmosis membrane, the second treated water being produced by adding the reducing agent.

12. The apparatus for producing purified water according to claim 11, wherein the raw water has a turbidity of 1 NTU or more and 100 NTU or less.

13. The apparatus for producing purified water according to claim 11, wherein the polyaluminum chloride has a basicity of more than 75%.

14. The apparatus for producing purified water according to claim 11, wherein the polyaluminum chloride includes aluminum chloride pentahydroxide, and the polyaluminum chloride feeder is configured to supply aluminum chloride pentahydroxide in an amount of 0.25 mg/L or more and 5 mg/L or less in terms of concentration of aluminum oxide ($Al_2O_3$) relative to the raw water.

15. The apparatus for producing purified water according to claim 11, the apparatus comprising one or more types selected from a sand filtration apparatus, a multimedia filter (MMF) filtration apparatus, a microfiltration (MF) apparatus, and an ultrafiltration apparatus between the polyaluminum chloride feeder and the reducing agent feeder.

16. A pure water production system comprising:

the apparatus for producing purified water described in claim 15;

an ultraviolet oxidation apparatus; and an ion exchange apparatus in this order.

17. The pure water production system according to claim 16, wherein the oxidizing disinfectant is at least one selected from the group consisting of a sulfamic acid-based compound, a sulfamic acid compound containing halogen, an isothiazoline-based compound, and a bromic acid compound.

18. The apparatus for producing purified water according to claim 11, wherein the oxidizing disinfectant is at least one selected from the group consisting of a sulfamic acid-based compound, a sulfamic acid compound containing halogen, an isothiazoline-based compound, and a bromic acid compound.

* * * * *